United States Patent

Hoffmann et al.

[15] 3,696,293
[45] Oct. 3, 1972

[54] PULSE-FREQUENCY TESTER
[72] Inventors: Gunther Hoffmann; Bernd Zabel, both of Eningen, Germany
[73] Assignee: Wandel u. Goltermann, Reutlingen, Germany
[22] Filed: Sept. 21, 1970
[21] Appl. No.: 73,766

[30]    Foreign Application Priority Data
    Oct. 8, 1969    Germany..........P 19 50 684.4

[52] U.S. Cl...............324/78 Q, 324/78 D, 324/79 D
[51] Int. Cl..........................G01r 23/02, G01r 23/14
[58] Field of Search.324/79 D, 79, 78 Q, 78 D, 78 R, 324/161; 340/253 Y; 328/133, 134, 141, 138

[56]              References Cited

UNITED STATES PATENTS 3,354,398   11/1967   Broadhead et al..324/79 DUX
3,502,995    3/1970   Cottatellucci et al..324/78 RX

OTHER PUBLICATIONS

Zimmerman; Elec. Ind. June 1965, pp. 100, 101 & 107.

Primary Examiner—Alfred E. Smith
Attorney—Karl F. Ross

[57]            ABSTRACT

A train of pulses of unknown repetition frequency, ranging between 2/3 and two times a predetermined cadence, is fed together with the output of the last two stages of a multistage binary counter to a coincidence circuit, the output frequency of the counter equaling the mean cadence of the unknown pulse train. Deviations of the pulse frequency from that cadence beyond predetermined upper and lower tolerance limits, as determined by the coincidence circuit, reset the counter to zero while operating one of two signal lamps to indicate the sign of such deviation. An associated timer may maintain the error-indicating signal lamp operated for a predetermined period and may also cause an automatic resetting of the counter to zero at the end of such period, subject to a restarting of the count by the next pulse of the unknown train.

9 Claims, 3 Drawing Figures

Günter Hoffman
Bernd Zabel
INVENTOR.

BY

Karl F. Ross
Attorney

PULSE-FREQUENCY TESTER

Our present invention relates to a system for testing a train of pulses to determine their unknown repetition frequency within certain limits.

Frequently, e.g. for the tuning of heterodyned radio receivers or of musical instruments, it is necessary to compare a source of reference frequency with the frequency of an unknown oscillation assumed to deviate from the reference frequency to a limited extent only.

The simple mixing of the two frequencies to produce a beat frequency equal to the difference of the original frequencies gives a quantitative indication of that difference but supplies no information regarding its sign. Other techniques, involving the conversion of sinusoidal waves (if originally present) into pulse trains, supply both sign and magnitude information but are relatively cumbersome and often entail considerable delays between measurement and readout.

The general object of our invention, therefore, is to provide an improved system for testing the cadence or repetition frequency of a pulse train with avoidance of the aforestated drawbacks.

More particularly, our invention aims at providing means for instantly and distinctly signaling deviations between the repetition frequencies of two pulse trains above or below specified tolerance limits.

These objects are realized, in accordance with our present invention, by the provision of a source of reference pulses recurring with a basic frequency which represents a multiple of a fixed cadence lying within a range of possible variations of a repetition frequency of an unknown pulse train to be tested. These reference pulses are supplied to a frequency divider with several cascaded binary step-down stages, the number of these stages being so chosen that the output of the final stage is a square wave with a fundamental frequency equal to the aforesaid fixed cadence. The output of that final stage is applied together with the unknown pulse train to a first coincidence gate whereas the second coincidence gate receives the same pulse train together with the output of a preceding stage; the two gates thereupon generate a first signal whenever the arrival of a pulse of that train coincides with a predetermined state of the final stage, e.g. the binary state 0, and a second signal upon coincidence of such a pulse with an alternate state (e.g. binary 1) of the final stage and a predetermined state (e.g. binary 0) of the preceding stage. The appearance of the first signal reverses the final stage whereas the appearance of the second signal reverses a preceding stage, thereby establishing a predetermined phase relationship between the stepped-down square wave and the unknown pulse train.

If the above-mentioned preceding stage is the one immediately followed by the final stage, the first coincidence signal will occur whenever the cycle length of the unknown pulse train falls between 50 percent and 75 percent of that of the reference square wave, the second coincidence signal being generated when the measured cycle length ranges between 125 percent and 150 percent of the reference period. Lamps or other indicator means may be energized by the two coincidence gates to make these conditions known to an attendant.

According to another advantageous feature of our invention, a timer synchronized with the incoming pulse train or operating independently thereof is connected to the two deviation indicators to maintain same operated for a period substantially exceeding a cycle of the reference square wave. The frequency divider may remain in this reset condition for an indefinite period if the train of incoming pulses is interrupted, being restarted by the arrival of the next pulse thereof.

These and other features of our invention will be described in detail hereinafter with reference to the accompanying drawing in which.

Figure 1:
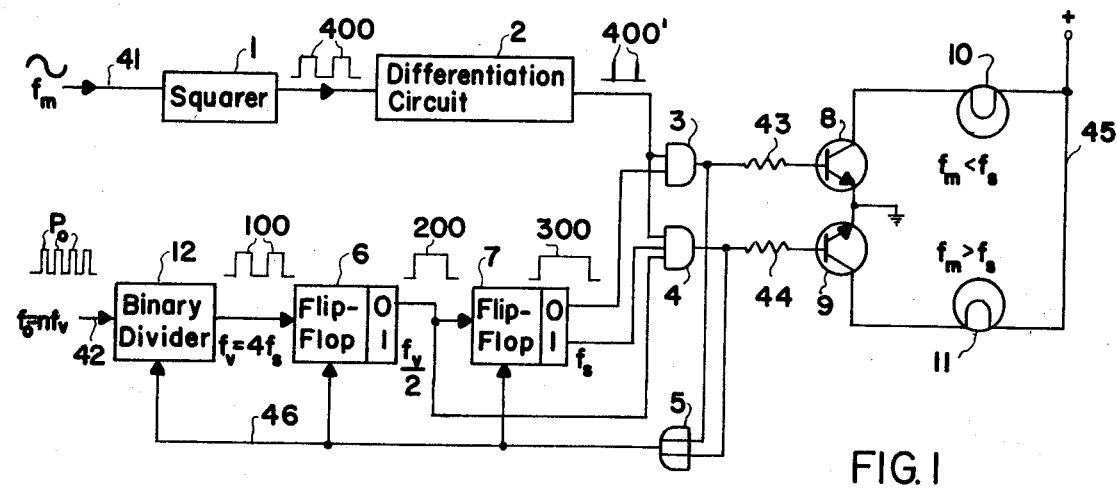
FIG. 1 is a block diagram of an embodiment of our invention.

In FIG. 1 we have shown an incoming line 41 delivering a sine wave of unknown frequency $f_m$ to a squarer 1 which converts it into a train of rectangular pulses 400 in a manner well known per se. These pulses are fed to a differentiation circuit 2 which derives from the leading or trailing edges of these rectangular pulses a train of relatively narrow pulses or spikes 400' applied to a first input of an AND gate 3 and a corresponding input of another AND gate 4 in parallel therewith.

Another line 42 carries a train of reference pulses $P_o$ of a basic frequency $f_o = nf_v$ where $f_v$ is a multiple (here a quadruple) of a standard frequency $f_s$ substantially midway within the range of expected variations of the unknown frequency $f_m$. The factor $n$ corresponds to the step-down ratio of a binary frequency divider 12 of one or more stages, the output of this divider being a train of rectangular pulses 100 of recurrence frequency or cadence $f_v = 4f_s$. The frequency of square wave 100 is halved in a further divider stage represented by a flip-flop 6 whose output 200 is thus a square wave of cadence $f_v/2 = 2f_s$. Another flip-flop 7 steps down the latter wave to generate a square wave 300 of the desired reference frequency $f_s$, this wave being applied to the second input of AND gate 3 and with relatively inverted phase to a corresponding input of AND gate 4. The latter gate also has a third input connected to the output of divider stage 6.

AND gates 3 and 4 work by way of respective resistors 43, 44 into a pair of transistor amplifiers 8 and 9 whose output circuits include indicator lamps 10 and 11 energizable from a source of operating voltage (here positive) on a bus bar 45. In addition, the outputs of AND gates 3 and 4 are connected through an OR gate 5 to a conductor 46 terminating at the resetting inputs of flip-flops 6 and 7 and of the last stage of divider 12. The last-mentioned connection may be omitted under circumstances requiring a less accurate pinpointing of the frequency deviation.

Figure 3:
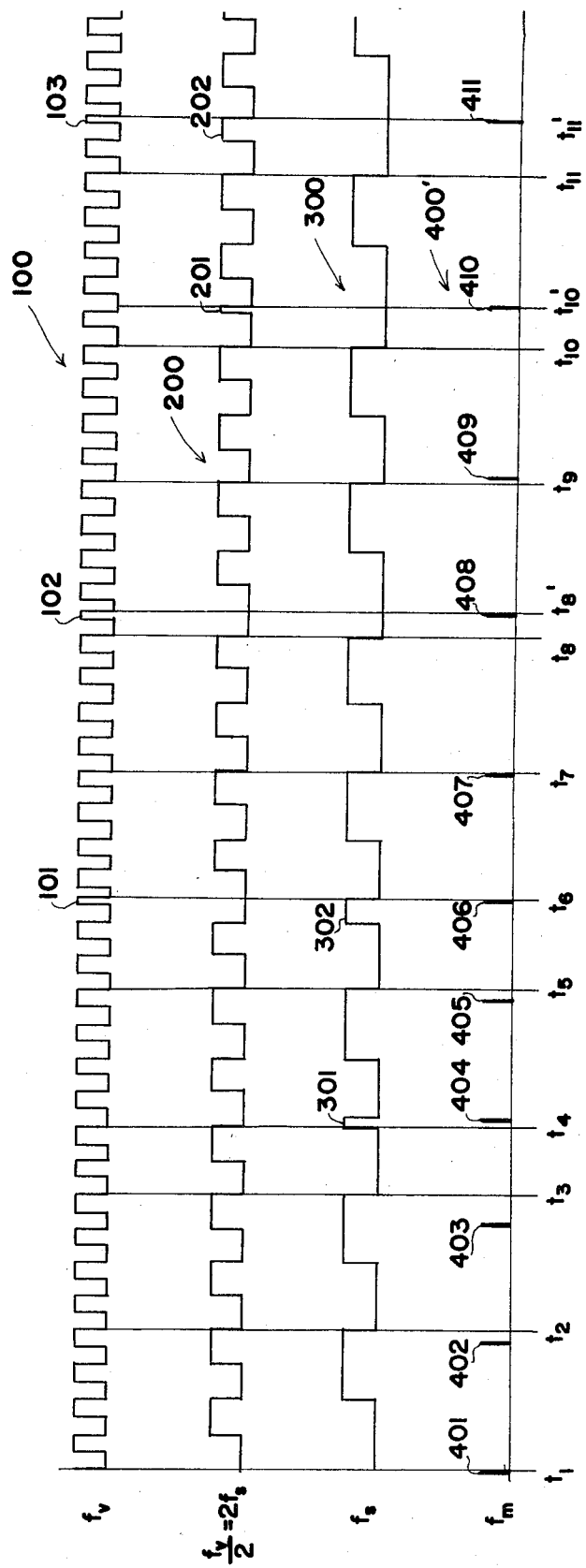
FIG. 3 is a set of graphs relating to the basis mode of operation of both embodiments.

The operation of the system of FIG. 1 will now be described with reference to FIG. 3 showing the pulse train 100, 200, 300 and 400' with their aforestated cadences.

It will be noted that the pulses of wave 200 appear and disappear on the trailing edges of the pulses of wave 100 and that an analogous relationship exists between waves 300 and 200.

The first pulse 401 of train 400', occurring at a time $t_1$, is deemed to be in the proper phase position with reference to square waves 100, 200 and 300, coinciding with the 0° point of frequency $f_s$ which represents the instant when all these square waves go to zero.

Flip-flops 6 and 7, together with the last stage of divider 12, may be considered part of a binary pulse counter advancing from a position 0,0,0 (0°–45°) to a position 1,1,1 (315°–360°). The next test pulse 402 is assumed to coincide with the digital position 1,1,1 occurring in the last eighth of a cycle. At that point, gate 3 is blocked by the absence of a "0" output from flip-flop 7 while gate 4 is also nonconductive in the absence of a similar output from flip-flop 6. Thus, the counter continues operating in its normal cyclic manner, restarting with the position 0,0,0 at an instant $t_2$ which represents the commencement of a new cycle; indicator lamps 10 and 11 remain unlit.

The next test pulse 403 is assumed to fall into the last quarter of the new cycle, more specifically into the first half of that quarter so as to coincide with a digital position 1,1,0. Again, gates 3 and 4 remain cut off and a further cycle is started at $t_3$ without the appearance of any error signal on indicators 10 and 11.

The following test pulse 404 has been shown to fall into the period between 180° and 225°, thus coinciding with the counter position 1,0,0. This means that gate 4 is opened by the concurrent presence of a "1" in the output of flip-flop 7 and a "0" in the output of flip-flop 6. Lamp 11 is lit to indicate that the test frequency $f_m$ exceeds the reference frequency $f_s$ beyond the permissible tolerance limits, i.e. that its cycle is less than 75 percent (but greater than 50 percent) of a cycle of wave 300. AND gate 4 also energizes, through OR gate 5, the conductor 46 which resets the flip-flop 7 (the other two counter stages being zeroized at this time) so as to establish immediately, at an instant $t_4$, the starting point of 0° for another cycle; this means that, as shown in FIG. 3, the pulse 301 of wave 300 is greatly foreshortened.

A further test pulse 405 has a time position similar to that of pulse 402 in its cycle and is therefore without effect. The next test pulse 406, however, occurs in the second half of the third quarter of the cycle starting at instant $t_5$ represented by the count 1,0,1. Once more, AND gate 4 conducts and causes a resetting of flip-flop 7, accompanied this time by a similar resetting of the last stage of divider 12 so as to give rise to a foreshortened pulse 101 in wave 100 along with another short pulse 302 in wave 300. This again marks the immediate restarting of the counter in position 0,0,0 at a time $t_7$, thus beginning a new cycle which is shown to be free from any test pulse.

In the second half of the first quarter of the cycle beginning at time $t_8$, another test pulse 408 coincides with the count 0,0,1 which results in the unblocking of gate 3 in response to a "0" output from flip-flop 7. Lamp 10 now lights to indicate that frequency $f_m$ lags behind frequency $f_s$. Simultaneously, conductor 46 is energized via OR gate 5 to reset the only counter stage set at this time, i.e. the terminal stage of divider 12, so as to create a foreshortened pulse 102 in train 100. This establishes a new starting point $t_8'$ for the cycle here considered.

Shortly after time $t_9$ marks the beginning of the next cycle, a test pulse 409 occurs and unblocks the gate 3. Since flip-flop 7 has an output "0", lamp 10 lights but nothing else takes place inasmuch as the count at this point is 0,0,0. Following the start of a subsequent cycle at time $t_{10}$, a test pulse 410 coincides with the count 0,1,0 at a point between 90° and 135° so that, again, gate 3 conducts and lights the lamp 10, the concurrent energization of conductor 46 resulting in a resetting of flip-flop 6 with foreshortening of its pulse 201 and a corresponding restarting of the cycle at time $t_{10}'$. After this cycle ends at time $t_{11}$ a pulse 411 coinciding with a count 0,1,1 foreshortens the pulses 103 and 202 of waves 100 and 200 then in existence, thereby restarting the corresponding cycle at a time $t_{11}$.

It will thus be seen that a test pulse emitted by circuit 2 leaves the lamps 10 and 11 unlit only if it occurs in the last eighth of a cycle, coinciding with the count 1,1,1, and that in the first eighth of a cycle such a pulse will have the sole effect of briefly lighting the lamp 10 without modifying the rhythm of the reference wave 300. If the test frequency drops further, to a minimum of two-thirds of the reference frequency, a low-frequency signal is emitted by lamp 10 and the cycle is restarted as described above; if the test frequency increases by more than one-third above the reference frequency, up to a maximum of twice that frequency, lamp 11 gives a high-frequency signal while the reference cycle then in progress is cut short.

If the connection from conductor 46 to divider 12 were omitted, the test pulse would be ineffectual (aside from the lighting of lamp 10) if occurring anywhere in the first quarter of a cycle, thus also in the position of pulse 408; if it occurred in the position of pulse 406, the next pulse of wave 200 could be generated 45° earlier than in the case discussed above.

Figure 2:
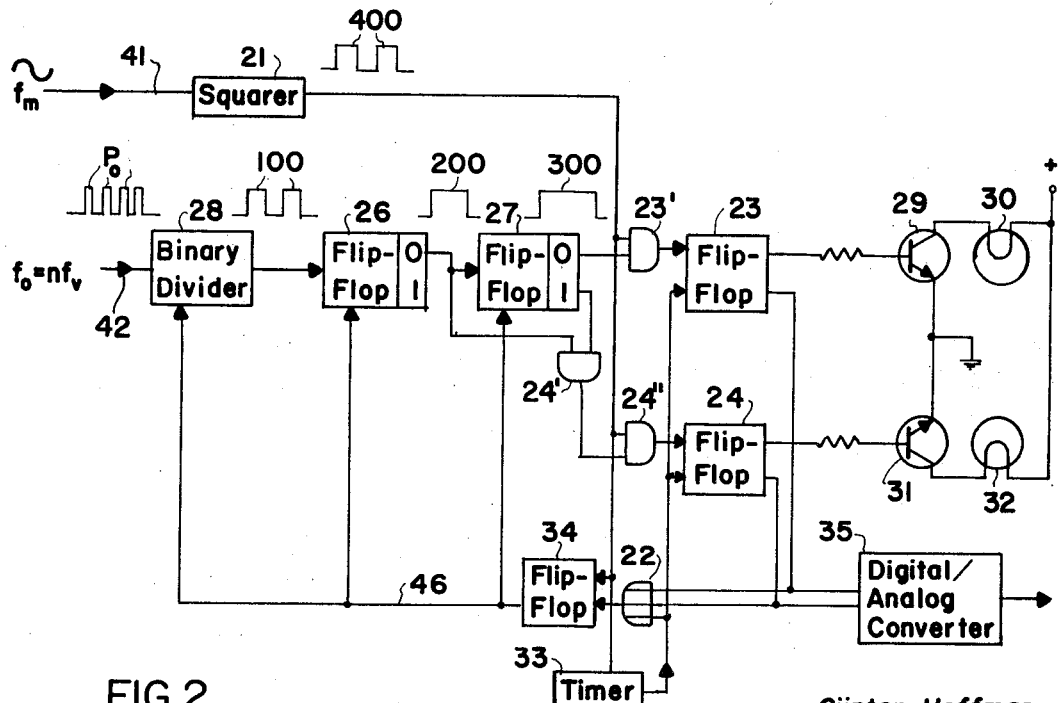
FIG. 2 is a similar diagram of another embodiment.

The system of FIG. 2 has the same basic components as that of FIG. 1, including a squarer 21 fed from line 41, a stepdown component with stages 28, 26, 27 respectively corresponding to units 12, 6 and 7 and connected to receive the pulses $P_o$ on line 42, and a pair of indicator lamps 30, 32 controlled by associated transistor amplifiers 29 and 31.

In this system, an AND gate 23' playing the part of gate 3 (FIG. 1) sets a normally reset flip-flop 23 to energize the lamp 30 for an extended period in response to a measured frequency $f_m$ falling short of the standard frequency $f_s$ to an extent greater than the aforedescribed lower tolerance limit. In an analogous manner, an AND gate 24" sets a normally reset flip-flop 24 to light the lamp 32 for an extended period whenever the measured frequency increases beyond its upper tolerance limit based on standard frequency $f_s$; AND gate 24" has its second input fed by another AND gate 24' connected to the set output ("1") of flip-flop 27 and to the reset output ("0") of flip-flop 26, these two cascaded AND gates being evidently the equivalent of gate 4 in FIG. 1.

A timer 33 works along with the reset outputs of flip-flops 23 and 24 into an OR gate 22 connected to the resetting input of a flip-flop 34; the reset output of this flip-flop is connected to conductor 46 which, when energized, zeroizes the three counting stages of frequency divider 26–28 in the manner previously described. The reset outputs of flip-flops 23 and 24 are also connected to respective inputs of a balanced digital/analog converter 35 to generate an imbalance signal proportional to the difference between the integrated idle periods of error indicators 30 and 32, this imbalance signal being therefore a measure of the deviation of the mean error from the standard; the sense of this deviation may be indicated by the polarity of the output voltage of unit 35.

Bistable element 34 is set upon the arrival of a test pulse from squarer 21, i.e. of a pulse of train 400 rather than 400' since the system of FIG. 2 lacks the differentiation circuit 2 of FIG. 1 (which, of course, could be included if desired). Such setting of flip-flop 34 de-energizes the conductor 46 so that unit 26-28 can start counting the cycles of a wave fed into the last stage of divider 28, reaching a count 1,1,1 in the last eighth of a cycle of reference wave 300 as described above. Depending upon the relative phasing of the pulses of train 400 and those of wave 300, flip-flop 23 or 24 may or may not be set during an interval measured by timer 33 which is started by the first pulse to appear in the output of squarer 21; timer 33 may be a monostable multivibrator or monoflop. If either flip-flop 23, 24 responds during that interval, flip-flop 34 is reset via OR gate 22 and re-energizes the lead 46 to reset the counter to its 0,0,0 position. After the timer 33 has run its course, the counter is reset independently of any previous resetting under the control of flip-flop 23 or 24; at the same time either of these flip-flops, if previously set, is reset by the timer output. The next test pulse then restarts the timer and the sequence is repeated. With this arrangement the error signal detected by AND gate 23' or 24" is stored in the associated flip-flop 23 or 24 for a maximum period equal to the timer interval which may be many times greater than the period of reference wave 300. If the pulse train 400 vanishes, the counter 26-28 is automatically reset by the timer and will not begin a new count until the train 400 reappears. This prevents the generation of an error signal in response to minor but cumulative positive or negative frequency deviations.

Naturally, lamps 10, 11 or 30, 32 are representative of a variety of signal indicators of the visual, audible or recording type. Similar indicators may be used in the output of integrating unit 35.

The timer 33 could also establish periodic resetting intervals independently of the pulse train 400. In that event, the timer could be an astable rather than a monostable element, such as a free-running multivibrator, disconnected from the output of squarer 21.

We claim:

1. A system for determining the magnitude of deviations of the repetition frequency of a pulse train within predetermined limits from a fixed cadence, comprising:
   a source of reference pulses recurring with a basic frequency representing a multiple of said cadence;
   step-down means supplied by said source including a final binary stage and a preceding binary stage connected in cascade, said final stage having relatively inverted first and second outputs in the form of a square wave with a fundamental frequency equal to said cadence;
   coincidence means including a first gate connected to receive the first output of said final stage together with said pulse train and a second gate connected to receive the output of said preceding stage together with the second output of said final stage and said pulse train, said first gate generating a first signal upon coincidence of a pulse of said train with a predetermined state of said final stage, said second gate generating a second signal upon coincidence of a pulse of said train with an alternate state of said final stage and a predetermined state of said preceding stage;
   resetting means connected to said coincidence means for reversing said final stage in response to said first signal and reversing said preceding stage in response to said second signal with modification of the length of a current cycle of said square wave and establishment of a predetermined phase relationship between said square wave and said pulse train; and
   first and second indicator means connected to said first and second gates for operation by said first and second signals, respectively.

2. A system as defined in claim 1 wherein said preceding stage is immediately followed by said final stage.

3. A system as defined in claim 2 wherein said step-down means includes at least one further binary stage ahead of said preceding stage, said resetting means being connected to said further stage for reversing same upon coincidence of a pulse of said train with at least one predetermined combination of states of all said stages.

4. A system as defined in claim 1, further comprising timer means connected to said first and second indicator means for maintaining same operated for a predetermined period substantially exceeding a cycle of said square wave.

5. A system as defined in claim 4 wherein said timer means comprises a monostable circuit connected to be triggered by the pulses of said train.

6. A system as defined in claim 4 wherein said resetting means is provided with an input circuit connected to said timer means for establishing said predetermined phase relationship at the end of said period.

7. A system as defined in claim 6 wherein said input circuit includes a bistable element connected to receive said pulse train for maintaining said resetting means effective from the end of said period to the occurrence of the next pulse of said train.

8. A system as defined in claim 4, further comprising storage means interposed between said gates and said indicator means, said storage means being connected to be reset by said timer means at the end of said period.

9. A system as defined in claim 1, further comprising integrating means connected to said gates for converting said signals into a continuous output.

* * * * *